US012798284B2

(12) United States Patent
Ahn

(10) Patent No.: US 12,798,284 B2
(45) Date of Patent: Nov. 17, 2026

(54) AUTO ROLLING AND ERASING WHITEBOARD

(71) Applicant: Jason Seong Hun Ahn, Ames, IA (US)

(72) Inventor: Jason Seong Hun Ahn, Ames, IA (US)

( * ) Notice: Subject to any disclaimer, the term of this patent is extended or adjusted under 35 U.S.C. 154(b) by 901 days.

(21) Appl. No.: 17/992,295

(22) Filed: Nov. 22, 2022

(65) Prior Publication Data

US 2024/0165987 A1 May 23, 2024

(51) Int. Cl.
*B43L 19/00* (2006.01)
*B43L 1/00* (2006.01)

(52) U.S. Cl.
CPC ............. *B43L 19/0006* (2013.01); *B43L 1/00* (2013.01)

(58) Field of Classification Search
CPC ......... B43L 1/00; B43L 19/0006; B43L 21/00
USPC .................................................. 434/411, 417
See application file for complete search history.

(56) References Cited

U.S. PATENT DOCUMENTS 1,227,205 A * 5/1917 Sartakoff .................. B43L 1/08 15/97.1
2,167,296 A * 7/1939 Farmer ................... B43L 21/00 15/98
5,607,312 A * 3/1997 Zhou ........................ B43L 21/00 434/408
2008/0160494 A1* 7/2008 Leifer ........................ B43L 1/06 434/408
2013/0000063 A1* 1/2013 Patamia .................... B08B 1/30 15/425

OTHER PUBLICATIONS

Post-It Dry Erase Whiteboard Film Surface, https://www.amazon.com/Post-Dry-Erase-Surface-Discontinued/dp/B00NC1D5YM, first posted Aug. 20, 2014 (8 pages).

* cited by examiner

*Primary Examiner* — Dmitry Suhol
*Assistant Examiner* — Julie Grace Dosher
(74) *Attorney, Agent, or Firm* — Wilmer Cutler Pickering Hale and Dorr LLP

(57) ABSTRACT

An auto rolling and erasing board system comprises a board; a motor; a first roller being positioned proximate to one side of the board; a second roller being positioned proximate to opposite side of the board, the second roller capable of being rotatably driven by the motor; a flexible sheet connected to the first and second roller across the board; an adjustable eraser bracket configured to slide toward and away from the flexible sheet; and a pair of side brackets supporting the board, the motor, the first and second rollers and the adjustable eraser bracket, wherein upon activation of the motor, the second roller is rotatably driven to rotate the first roller, thereby causing the flexible sheet to rotate across the board.

18 Claims, 4 Drawing Sheets

AUTO ROLLING AND ERASING WHITEBOARD

FIELD OF THE INVENTION

The present innovations generally address automatic rolling and erasing board systems. More particularly, the present innovations relate to systems and methods of automatically rolling boards to keep hand-written notation on the boards. The present innovations also relate to systems and methods of automatically rolling boards to erase hand-written notation boards.

BACKGROUND

Whiteboards and chalkboards are a well-known medium that provide a convenient surface upon which notes, drawings, charts or other hand-written notations may be made. Whiteboards and chalkboards are often used in group discussion as boards facilitate sharing of individual thoughts in group discussions. The various hand-written notations made on boards are erasable by the manual manipulation of an eraser.

It is often desirable to leave written material on whiteboards or chalkboards for a period of time. That is, it is often not feasible to immediately erase all written material after each use, for purposes of presentation to other audiences, etc. However, to write new notations, the previous written materials must be erased. Moreover, both whiteboards and chalkboards are erased by manual user action, which is tedious. Typically, a user would obtain an eraser and then apply the eraser to the surface of the whiteboard or chalkboard in an often non-uniform motion to wipe-off the written notations thereon. Such manual erasure is time-consuming and deemed a chore. Thus, it would be desirable to provide an automatic rolling and erasing board system which is efficient, practical and adaptive to different places.

SUMMARY

The present disclosure is directed at systems for automatic rolling and erasing boards. In some embodiments, a system comprises a board; a motor; a first roller being positioned proximate to one side of the board; a second roller being positioned proximate to opposite side of the board, said second roller capable of being rotatably driven by the motor; a flexible sheet connected to the first and second roller across the board; an adjustable eraser bracket configured to slide toward and away from the flexible sheet; and a pair of side brackets supporting the board, the motor, the first and second rollers and the adjustable eraser bracket, wherein upon activation of the motor, the second roller is rotatably driven to rotate the first roller, thereby causing the flexible sheet to rotate across the board. In an exemplary embodiment, the system further comprises switches to activate and deactivate the motor. In another exemplary embodiment, the system comprises a switch to reverse a rotation direction. In another exemplary embodiment, the motor further comprises a remote wireless receiver. In another exemplary embodiment, the flexible sheet is a flexible whiteboard sheet.

In some embodiments of an automatic rolling and erasing board system, the adjustable eraser bracket is physically touching the flexible sheet. In some embodiments, the system provides uniform erasure of non-permanent markings from the flexible sheet. In some embodiments of an automatic rolling and erasing board system, the adjustable eraser bracket is not touching the flexible sheet. In some embodiments of an automatic rolling and erasing board system, the adjustable eraser bracket is L-shaped.

In some embodiments, a method is for automatically erasing a board, the method comprising: sliding an adjustable eraser bracket toward a flexible sheet, wherein the flexible sheet is connected to two rollers and positioned across the board; locking the position of the adjustable eraser bracket, thereby the adjustable eraser bracket is physically touching the flexible sheet; and activating a motor to rotate the flexible sheet across the board. In one exemplary embodiment, the motor is activated by a switch. In one exemplary embodiment, the motor is reversible in its driving direction. In one exemplary embodiment, the motor further comprises a remote wireless receiver. In some embodiments, the method provides uniform erasure of non-permanent markings from the sheet. In some embodiments of a method for automatically erasing a board, the eraser bracket is L-shaped.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

FIG. 1A shows a front view of an exemplary automatic rolling and erasing board system according to one embodiment of the invention. FIG. 1B shows a side of an exemplary automatic rolling and erasing board system according to one embodiment of the invention.

FIG. 2A shows a front view of an exemplary automatic rolling and erasing board system arranged in a position that an adjustable eraser bracket is moved toward a flexible sheet according to one embodiment of the invention. FIG. 2B shows a side view of an exemplary automatic rolling and erasing board system according to one embodiment of the invention.

DETAILED DESCRIPTION

In the following description, numerous specific details are set forth regarding the structures, systems, and methods of the disclosed subject matter and the environment in which such structures, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other structures, systems, and methods that are within the scope of the disclosed subject matter.

Figure 1B:
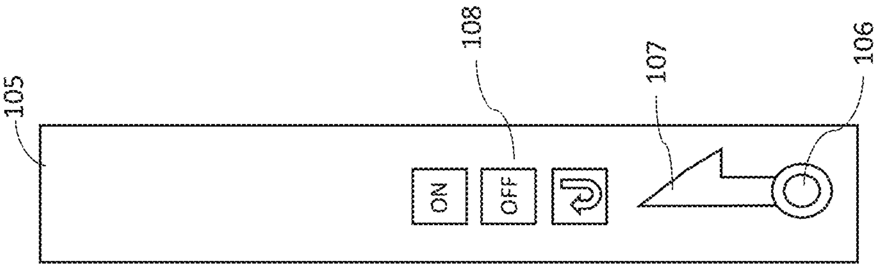
FIGS. 1A and 1B.
Figure 1A:
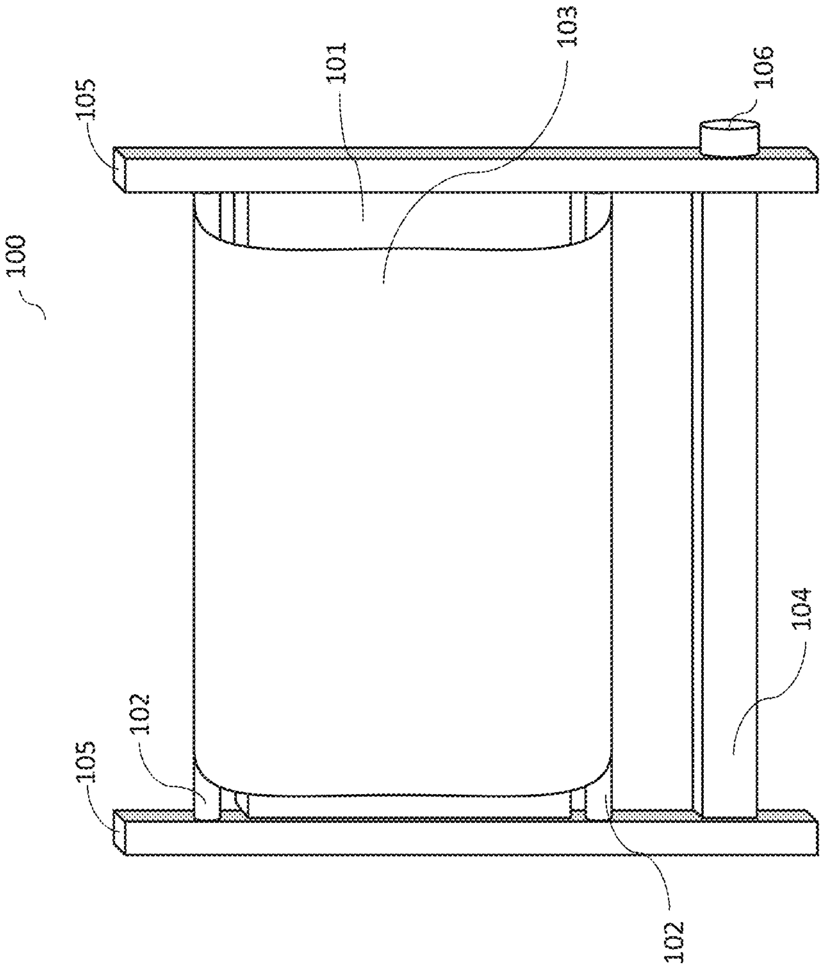

FIG. 1A shows an exemplary auto rolling and erasing board system according to one aspect of the present principles. In certain embodiments, an auto rolling and erasing board system 100 comprises a board 101, a pair of rollers 102, a flexible sheet 103, an adjustable eraser bracket 104 and a pair of side bracket 105. In certain embodiments, the pair of rollers 102 is positioned proximate to opposite sides of the board 101, and the flexible sheet 103 is connected to the rollers 102 across the board 101. In certain embodiments, when erasure process is not performed, the adjustable eraser bracket 104 is placed away from the flexible sheet 103. In certain embodiments, the side brackets 105 are used to hold the board 101, the rollers 102 and the adjustable eraser bracket 104 in place. In certain embodiment, the auto rolling and erasing board is a freestanding board. In certain embodiment, the auto rolling and erasing board is mountable to a surface.

Figure 2B:
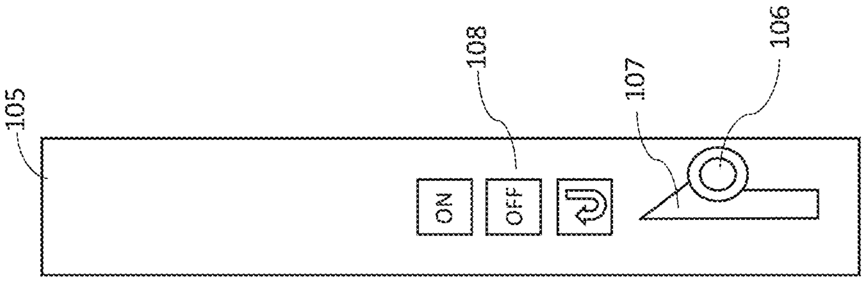
FIGS. 2A and 2B.
Figure 2A:
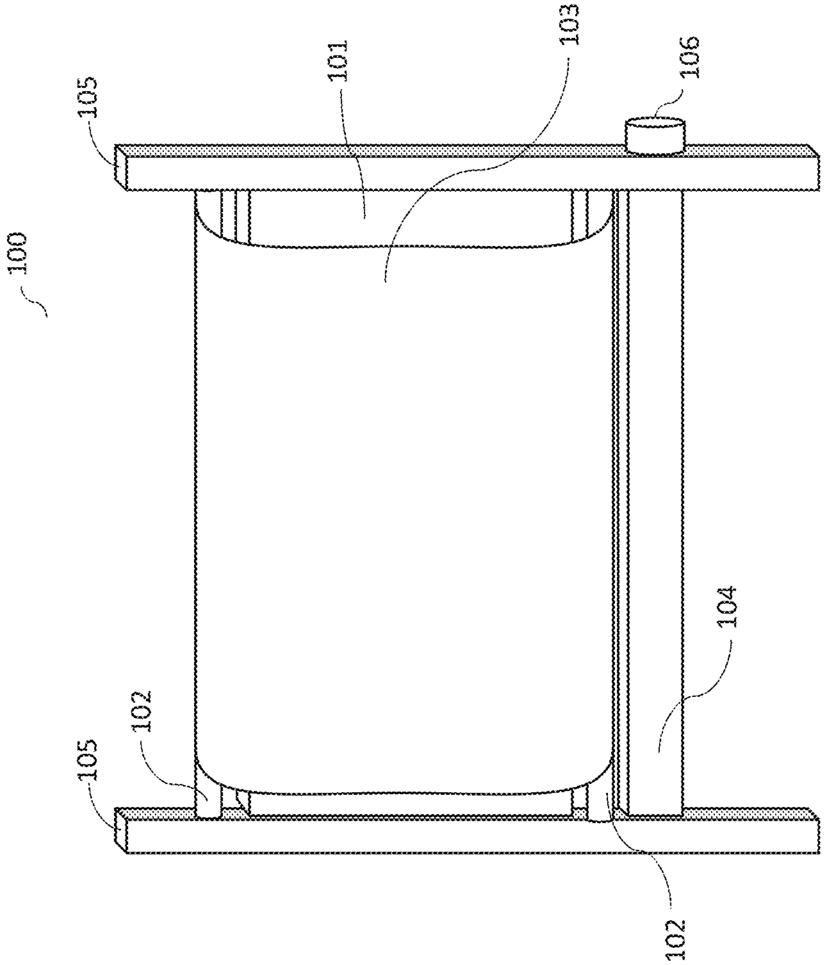

FIG. 2A shows another exemplary auto rolling and erasing board system according to another embodiment of the invention. In certain embodiments, an auto rolling and erasing board system 100 comprises a board 101, a pair of rollers 102, a flexible sheet 103, an adjustable eraser bracket 104 and a pair of side bracket 105. In certain embodiments, the pair of rollers 102 is positioned proximate to opposite side of the board 101, and the flexible sheet 103 is connected to the rollers 102 across the board 101. In certain embodiments, the auto rolling and erasing board system 100 operates to automatically erase non-permanent markings that have been previously placed on the sheet 103. In certain embodiments, when erasure process is performed, the adjustable bracket 104 is placed adjacent to one of the rollers 102 and abut against the surface of the flexible sheet 103. In certain embodiments, the side brackets 105 are used to hold the board 101, the rollers 102 and the adjustable eraser bracket 104 in place. In certain embodiment, the auto rolling and erasing board is a freestanding board. In certain embodiment, the auto rolling and erasing board is mountable to a surface.

FIGS. 1B and 2B show side views of the auto rolling and erasing board systems. In certain embodiments, a bracket holder 106 is connected to the adjustable eraser bracket 104. In certain embodiments, the adjustable eraser bracket is movable by using a bracket holder 106. In certain embodiments, in order to affix the adjustable eraser bracket such that it is physically touching the flexible sheet 103 to be erased, the bracket holder 106 can be locked in a bracket locker 107.

Figure 3:
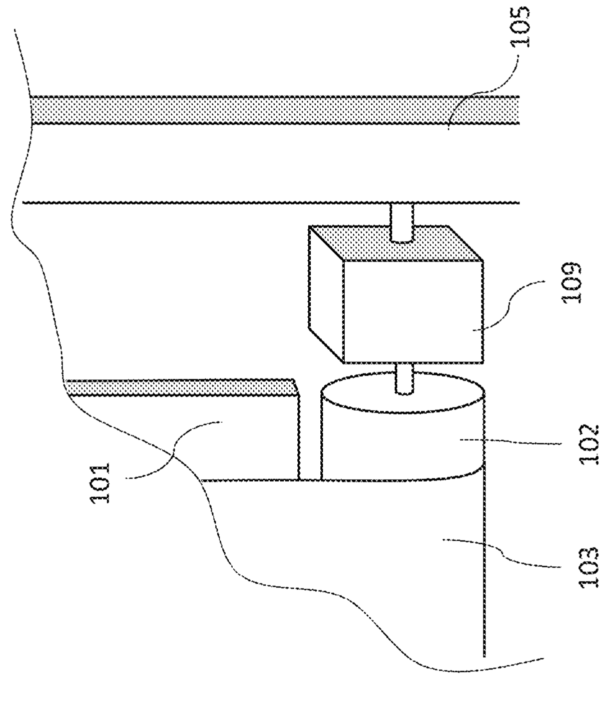
FIG. 3 is an interior view of the rotating mechanism of the system according to one embodiment of the invention.

In certain embodiments, the auto rolling and erasing board system also comprises a motor 109, as shown in FIG. 3. In certain embodiments, when the rolling process is to be performed, the motor 109 drives the roller 102 in a rotational manner. In certain embodiments, as the motor 109 causes the flexible sheet 103 to be driven across the length of the board 101, the entire surface of the flexible sheet 103 is able to be erased in a uniform manner. In certain embodiments, a part of the flexible sheet 103 is able to be erased. In certain embodiments, the motor 109 may be activated or deactivated under the control of a user switch 108 as shown in FIGS. 1B and 2B. In certain embodiments, the direction of the rotation may be altered using the user switch 108. In certain embodiments, a user would cause the start switch 108 to produce the start signal when a board is to be erased. In certain embodiments, the auto rolling and erasing board system 100 can couple power provided by a power source to a motor 109, thereby permitting the motor 109 to be activated. In certain embodiments, the power source can be a battery or a power outlet. In certain embodiments, the power source can be provided by a regulated AC current provided by a power outlet. In certain embodiments, the motor 109 further comprises a remote wireless receiver.

Figure 4:
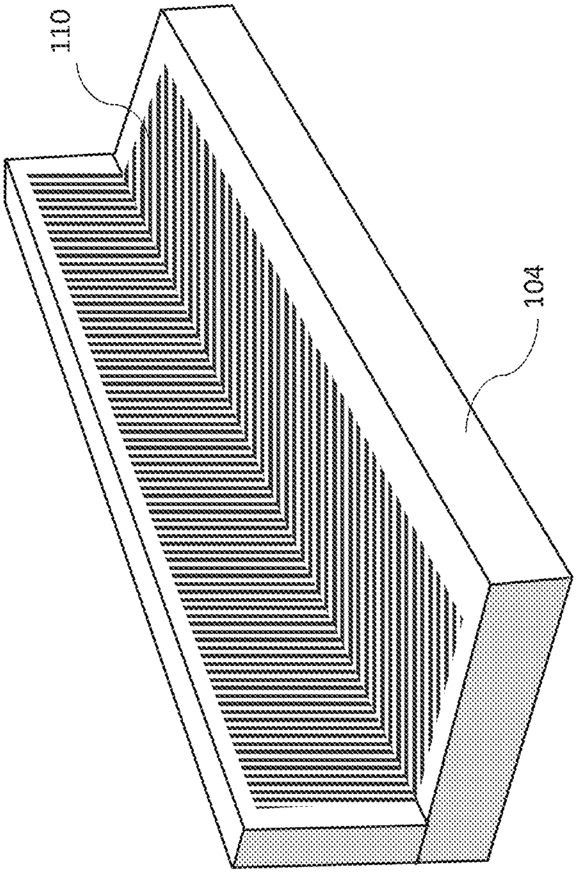
FIG. 4 is a back view of an exemplary adjustable erasing bracket according to one embodiment of the invention.

In certain embodiments, the auto rolling and erasing board system also includes an adjustable eraser bracket 104 configured to slide toward or away from the flexible sheet 103. In certain embodiments, the adjustable eraser bracket 104 may comprise an L-shaped (e.g., 104 in FIG. 4). In certain embodiments, the adjustable eraser bracket can abut against the surface of the flexible sheet 103 during the erasure process as shown in FIG. 2A. In certain embodiments, the adjustable eraser bracket comprises an inner surface 110. In certain embodiments, the adjustable eraser bracket 104 comprises a durable, tear-resistant, highly abrasion resistant and/or ballistic material which has a high tear strength. In non-limiting embodiments, such materials may comprise nylon composites with or without coating or materials made of synthetic fiber comprising poly-paraphenylene terephthalamide which is construed of para-aramid fibers.

In certain embodiments, the flexible sheet 103 comprises essentially of a plastic material selected from the group consisting of acrylonitrile-butadiene styrene (ABS), polyvinyl chloride, expanded polyvinyl chloride, and polystyrene. In certain embodiments, the flexible sheet 103 is in colors. In certain embodiments, the flexible sheet 103 is clear. In non-limiting embodiments, the flexible sheet 103 is in color white.

Various other modifications, including additions and removals, can be made to the exemplary embodiments discussed without departing from the scope of the present disclosure. For example, while the embodiments described above refer to particular features, components, or particular steps, the scope of this disclosure also includes embodiments having different combinations of features, components, or steps, and embodiments that do not include all of the above-described features, components, or steps.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting.

The invention claimed is:

1. A system for an automatic rolling and erasing board, the system comprising:

a board;

a motor;

a first roller being positioned proximate to one side of the board;

a second roller being positioned proximate to opposite side of the board, wherein the second roller is capable of being rotatably driven by the motor;

a flexible sheet connected to the first and second rollers across the board;

a pair of side brackets supporting the board, the motor, and the first and second rollers; and an adjustable eraser bracket located below the board and engaged with the side brackets such that the adjustable eraser bracket is configured to vertically slide toward and away from the flexible sheet while being disposed between the side brackets, wherein upon activation of the motor, the second roller is rotatably driven to rotate the first roller, thereby causing the flexible sheet to rotate across the board; and a bracket holder connected to the adjustable eraser bracket; and a bracket locker for locking the bracket holder such that the adjustable eraser bracket is fixed in a position where the adjustable eraser bracket is physically touching the flexible sheet;

wherein the bracket holder is positioned proximate to a first side bracket of the pair of side brackets, the bracket holder and the adjustable eraser bracket being on opposite sides of the first side bracket; and the bracket locker comprises an opening in the first side bracket, the opening having a shape that allows the bracket holder to rest in the position where the adjustable eraser bracket is physically touching the flexible sheet.

2. The system of claim 1, further comprising one or more motors.

3. The system of claim 1, further comprising a switch to activate and deactivate the motor.

4. The system of claim 1, wherein the motor is reversible in its driving direction.

5. The system of claim 4 further comprising a switch to reverse a rotation direction.

6. The system of claim 1, wherein the motor further comprises a remote wireless receiver.

7. The system of claim 1, wherein the adjustable eraser bracket is physically touching the flexible sheet.

8. The system of claim 7, wherein the system provides uniform erasure of non-permanent markings from the flexible sheet.

9. The system of claim 1, wherein the adjustable eraser bracket is not physically touching the flexible sheet.

10. The system of claim 1, wherein the adjustable eraser bracket is L-shaped.

11. The system of claim 1, wherein the system is mountable to a surface.

12. The system of claim 1, wherein the system is a freestanding system.

13. A method for automatically erasing a board, the method comprising:

sliding an adjustable eraser bracket toward a flexible sheet, wherein the flexible sheet is connected to two rollers and positioned across the board;

wherein the adjustable eraser bracket is located below the board and engaged with side brackets such that the adjustable eraser bracket is configured to vertically slide toward and away from the flexible sheet while being disposed between the side brackets;

locking the position of the adjustable eraser bracket, thereby the adjustable eraser bracket is physically touching the flexible sheet; and activating a motor to rotate the flexible sheet across the board; and a bracket holder connected to the adjustable eraser bracket; and a bracket locker for locking the bracket holder such that the adjustable eraser bracket is fixed in a position where the adjustable eraser bracket is physically touching the flexible sheet;

wherein the bracket holder is positioned proximate to a first side bracket of the side brackets, the bracket holder and the adjustable eraser bracket being on opposite sides of the first side bracket; and the bracket locker comprises an opening in the first side bracket, the opening having a shape that allows the bracket holder to rest in the position where the adjustable eraser bracket is physically touching the flexible sheet.

14. The method of claim 13, wherein the motor is activated by a switch.

15. The method of claim 13, wherein the motor is reversible in its driving direction.

16. The method of claim 13, wherein the motor further comprises a remote wireless receiver.

17. The method of claim 13, wherein the method provides unform erasure of non-permanent markings from the flexible sheet.

18. The method of claim 13, wherein the erasure bracket is L-shaped.

* * * * *